(12) United States Patent
Fujii et al.

(10) Patent No.: US 8,108,789 B2
(45) Date of Patent: Jan. 31, 2012

(54) INFORMATION PROCESSING DEVICE, USER INTERFACE METHOD, AND INFORMATION STORAGE MEDIUM

(75) Inventors: Takahiro Fujii, Tokyo (JP); Ryuji Nakayama, Tokyo (JP); Hiroki Kato, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 454 days.

(21) Appl. No.: 12/373,208

(22) PCT Filed: Mar. 13, 2007

(86) PCT No.: PCT/JP2007/054964
§ 371 (c)(1),
(2), (4) Date: Feb. 12, 2009

(87) PCT Pub. No.: WO2008/012965
PCT Pub. Date: Jan. 31, 2008

(65) Prior Publication Data
US 2009/0293008 A1 Nov. 26, 2009

(30) Foreign Application Priority Data
Jul. 25, 2006 (JP) .................................. 2006-202590

(51) Int. Cl.
*G06F 3/048* (2006.01)
*G06N 5/02* (2006.01)
(52) U.S. Cl. ......... 715/769; 715/763; 715/848; 715/862
(58) Field of Classification Search .................. 715/764, 715/769, 763, 835
See application file for complete search history.

(56) References Cited

U.S. PATENT DOCUMENTS

| | | | |
|---|---|---|---|
| 6,894,688 B2* | 5/2005 | Tsuda et al. | 345/419 |
| 6,968,511 B1* | 11/2005 | Robertson et al. | 715/835 |
| 7,104,890 B2* | 9/2006 | Tsuda et al. | 463/30 |
| 7,587,681 B2* | 9/2009 | Kake et al. | 715/805 |
| 2004/0021661 A1* | 2/2004 | Tsuda et al. | 345/419 |
| 2004/0023717 A1* | 2/2004 | Tsuda et al. | 463/30 |
| 2005/0010599 A1* | 1/2005 | Kake et al. | 707/104.1 |
| 2006/0126068 A1* | 6/2006 | Shribak et al. | 356/364 |
| 2007/0244870 A1* | 10/2007 | Laurent et al. | 707/3 |

OTHER PUBLICATIONS

International Preliminary Report on Patentability for corresponding PCT application PCT/JP2007/054964, Jun. 27, 2009.

(Continued)

*Primary Examiner* — Boris Pesin
*Assistant Examiner* — Daeho Song
(74) *Attorney, Agent, or Firm* — Matthew B. Dernier, Esq.; Gibson & Dernier, LLP

(57) ABSTRACT

To group a plurality of data items through a simple operation, an information processing device includes a displaying unit for displaying an image of a virtual space where a plurality of data-related positions respectively associated with a plurality of data items are set and each data-related position is surrounded solely or together with other data-related position by a closed area, such that each closed area is distinctive; an operation unit for allowing a user to operate so as to arbitrarily move the data-related position in the virtual space; a closed area update unit for updating each closed area in the virtual space according to movement of the data-related position in the virtual space; and a grouping unit for grouping, when the plurality of data-related positions are surrounded by a common closed area, data associated with the respective data-related positions.

10 Claims, 6 Drawing Sheets

OTHER PUBLICATIONS

Nayuko Watanabe, Takeo Igarashi, Bubble Clusters : Icon no Kukanteki na Matomari o Riyo shita Joho Kanari Kiko, Dai 13 Kai Workshop on Interactive Systems and Software (WISS 2005) Ronbunshu, ISSN 1341-87OX No. 38, pp. 75 to 80, Dec. 7, 2005.

International Search Report for corresponding PCT application PCT/JP2007/054964, Apr. 10, 2007.

Office Action for Japanese Application JP-2006-202590, dated Oct. 19, 2010.

Nayuko Watanabe, et, al., "Bubble Clusters: Information Management Mechanism Using Spatial Clusters of Icons" The 13th Workshop on Interactive Systems and Software, Japan Society for Software Science and Technology, pp. 75-80, Dec. 7, 2005.

* cited by examiner (a)

| DATA ID | PASS | DATA-RELATED POSITION | THUMBNAIL DATA | ATTRIBUTE 1 | ATTRIBUTE 2 |
|---|---|---|---|---|---|
| F001 | C:\001.mov | (X001, Y001, Z001) | C:\thumb\001.bmp | KEYWORD A, KEYWORD B | REPRODUCTION PROGRAM α |
| F002 | C:\002.mov | (X002, Y002, Z002) | C:\thumb\002.bmp | KEYWORD A, KEYWORD C | REPRODUCTION PROGRAM α |
| F003 | C:\003.mpg | (X003, Y003, Z003) | C:\thumb\003.bmp | KEYWORD D | REPRODUCTION PROGRAM β |
| ... | ... | ... | ... | ... | ... |
| F101 | C:\alpha.exe | (X101, Y101, Z101) | C:\thumb\101.bmp | KEYWORD P, KEYWORD Q | *.mov |
| F102 | C:\beta.exe | (X102, Y102, Z102) | C:\thumb\102.bmp | KEYWORD R | *.mpg |
| ... | ... | ... | ... | ... | ... |

FIG.11
| GROUP ID | DATA ID |
|---|---|
| G001 | F001, F002 |
FIG.12
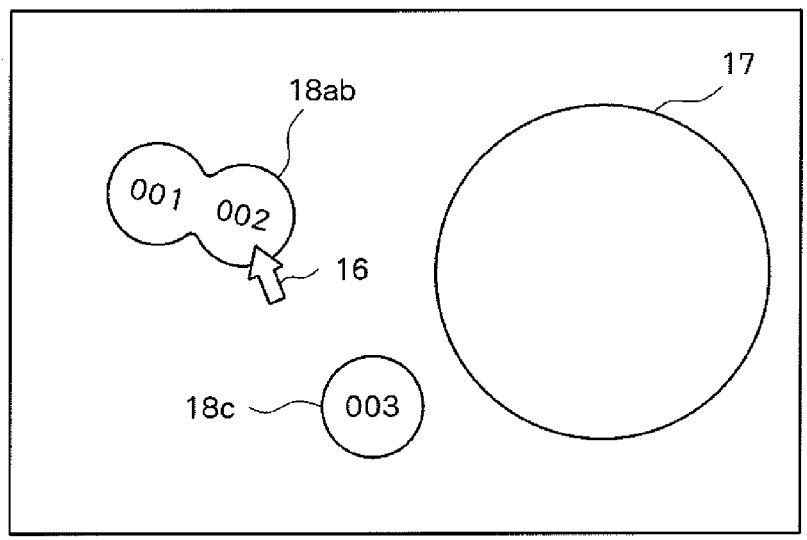
(a)
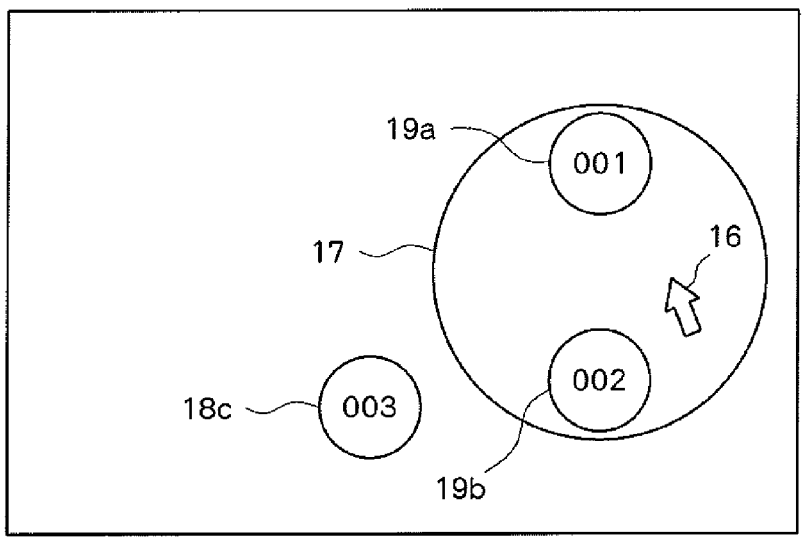
(b)

INFORMATION PROCESSING DEVICE, USER INTERFACE METHOD, AND INFORMATION STORAGE MEDIUM

TECHNICAL FIELD

The present invention relates to an information processing device, a user interface method, and an information storage medium, and more particularly, to a user interface for grouping data.

BACKGROUND ART

Graphic user interfaces (GUI) have remarkably contributed to improvement in easiness with which to use various information processing devices. In general GUIs, icons representative of various data items and a folder icon representative of a folder for holding one or more data items are shown on a monitor. By moving any data icon by means of a so-called drag and drop operation to the display position of a folder icon, it is possible to hold the data in the folder. With an operation to hold a plurality of data items in a common holder, the user can group the data items.

However, according to a conventional GUI, a troublesome operation is required in grouping a plurality of data items as a holder needs to be initially produced by executing a command for producing a new holder.

The present invention has been conceived in view of the above, and aims to provide an information processing device, a user interface method, and an information storage medium for grouping a plurality of data items through an easy operation.

SUMMARY OF THE INVENTION

In order to address the above-described problem, according to one aspect of the present invention, there is provided an information processing device, comprising displaying means for displaying an image of a space where a plurality of data-related positions respectively associated with a plurality of data items are set and each data-related position is surrounded solely or together with other data-related position by a closed area, such that each closed area is distinctive; operation means for allowing a user to operate so as to arbitrarily move the data-related position in the space; closed area update means for updating each closed area in the space according to movement of the data-related position in the space; and grouping means for grouping, when the plurality of data-related positions are surrounded by a common closed area, data associated with the respective data-related positions.

According to another aspect of the present invention, there is provided a user interface method, comprising a space image display step of displaying an image of a space where a plurality of data-related positions respectively associated with a plurality of data items are set and each data-related position is surrounded solely or together with other data-related position by a closed area, such that each respective closed area is distinctive; a movement operation receiving step of receiving an operation by a user to arbitrarily move the data-related position in the space; a closed area update step of updating each closed area in the space according to movement of the data-related position in the space; and a grouping step of grouping, when the plurality of data-related positions are surrounded by a common closed area, data associated with the respective data-related positions.

According to still another aspect of the present invention, there is provided a computer readable information storage medium storing a program for causing a computer to function as displaying means for displaying an image of a space where a plurality of data-related positions respectively associated with a plurality of data items are set and each data-related position is surrounded solely or together with other data-related position by a closed area, such that each closed area is distinctive; operation means for allowing a user to operate so as to arbitrarily move the data-related position in the space; closed area update means for updating each closed area in the space according to movement of the data-related position in the space; and grouping means for grouping, when the plurality of data-related positions are surrounded by a common closed area, data associated with the respective data-related positions. The computer may include, for example, a personal computer, a consumer game machine, a commercial game machine, a portable game machine, a portable phone, a personal digital assistant, and so forth. The program may be stored in a computer readable information storage medium such as a CD-ROM, a DVD-ROM, and so forth.

According to the present invention, a data-related position is set in association with each data item. Each data-related position is surrounded by a closed area either solely or together with other one or more data-related position/positions. Then, the image of the space is displayed such that each closed area is distinctive. In the present invention, the user can arbitrarily move the data-related position. Then, with the data-related position having been moved, each closed area is updated accordingly. With the closed area updated and a plurality of data-related positions surrounded by a common closed area, data associated with the data-related positions are grouped. According to the present invention, by moving the data-related position in the space, a plurality of data items can be readily grouped. It should be noted that, in the present invention, the "space" includes not only a three dimensional space but also two dimensional space, that is, a plane.

In one embodiment, the grouping means may cause the data-related positions surrounded by the common closed area to move following each other in the space, according to an operation carried out by the operation means. With the above, it is possible to collectively move the data-related positions associated with the grouped data items in the space.

In another embodiment, the closed area update means may set an area as the closed area in the space, the area being a set of positions where a sum of function values of distances to the respective data-related positions is equal to or larger than a predetermined threshold. The value calculated according to the distance to the data-related position may be a value obtained by substituting the distance to the data-related position into a predetermined decreasing function. With the above, it is possible to readily display the image of the space by applying so-called metaball technique.

In still another embodiment, the information processing device may further comprise threshold changing means for changing the predetermined threshold. With the above, by changing the predetermined threshold, adjacent data-related positions may be surrounded by a common closed area or surrounded respectively by separate closed areas.

In yet another embodiment, the information processing device may further comprise data-related position approaching and separating means for calculating a degree of relevance between data items based on attribute information on the respective data items, and causing the data-related positions associated with the data items to approach or separate with respect to each other in the space. With the above, it is possible to promote grouping depending on the degree of relevance between data or suppressing grouping. This enhances user convenience.

In yet another embodiment, the operation means may be means for enabling the user to arbitrarily move the closed area distinctively displayed by the image, and for moving, when moving the closed area, one or more data-related positions surrounded by the closed area. With the above, by moving a desired closed area, using the operation means, it is possible to move the data-related position surrounded by the closed area.

BRIEF DESCRIPTION OF THE DRAWINGS

FIG. 10 is a diagram showing a structure of a data information database;

FIG. 11 is a diagram showing a structure of a group database; and

FIG. 12 is a diagram showing another example of a space image.

DETAILED DESCRIPTION OF THE INVENTION

In the following, one embodiment of the present invention will be described in detail based on the accompanying drawings.

An information processing device according to this embodiment comprises a computer, in which a virtual space is created in the memory device of the computer. In the virtual space, data-related positions of various data items stored in the computer or another computer connected to that computer via a network are set. The data includes data on a static image, a motion image, music, and so forth (process target data), for example, data on a program for processing the data through reproduction, editing, and so forth. An image (space image) of the virtual space is shown on a display device which constitutes the information processing device. The space image constitutes a graphic user interface for use by the user in instructing data grouping and grouped data releasing, as well as processing of various process target data, using a program.

Figure 1:
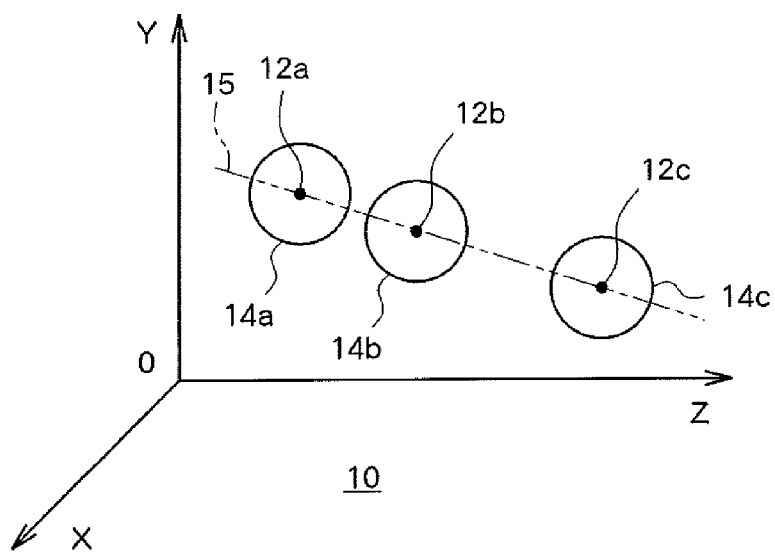
FIG. 1 is a diagram showing a virtual space (before movement of a closed area) to be managed in an information processing device according to an embodiment of the present invention.

FIG. 1 is a diagram showing one example of the virtual space. As shown, a three dimensional virtual space 10 is created in the memory device of the computer, with data-related positions 12a to 12c associated with respective electronic data items set in the virtual space 10. In FIG. 1, the data-related positions 12a to 12c in the virtual space 10 are respectively surrounded by three dimensional closed areas 14a to 14c.

Figure 2:
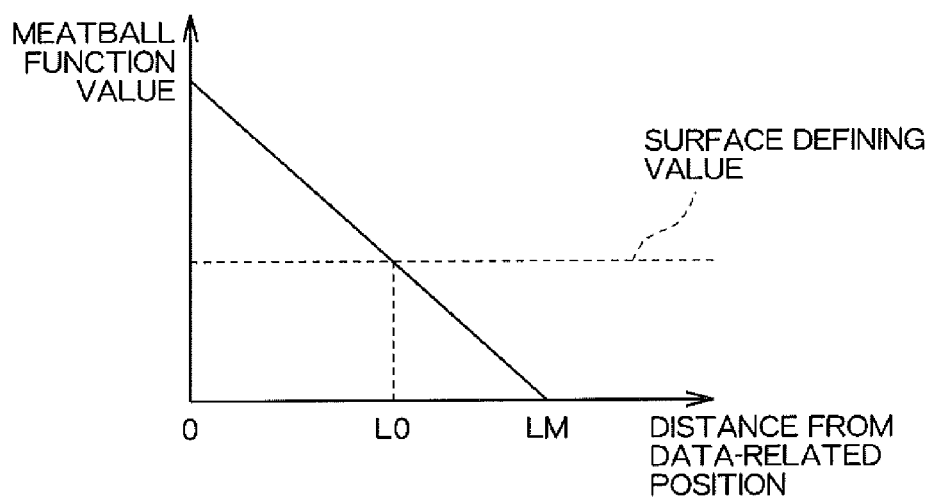
FIG. 2 is a diagram showing one example of a metaball function.

These closed areas 14a to 14c are shown as area images to be described later on the display device by means of a computer graphics method referred to as a so-called metaball. That is, a metaball function is made associated with each data-related position 14a to 14c, and sets of the positions, or areas, in the virtual space 10, where the sum of the function values thereof (the concentration value of the metaball) is equal to or larger than a predetermined threshold (a surface defining value) is determined as closed areas (areas occupied by the metaball) 14a to 14c. FIG. 2 shows an example of a metaball function. As indicated by the solid line in FIG. 2, the metaball function is a decreasing function concerning the distance from each data-related position, with the metaball function value of a position away from the concerned data-related position by a distance equal to or longer than a predetermined distance LM being zero. For example, in the case where one data-related position is defined in the virtual space 10 or a plurality of data-related positions are defined apart from each other by a distance larger than 2 LM, the surface of a closed area which surrounds each data-related position is defined in positions where the function values of the metaballs associated with that data-related positions amount to a predetermined surface defining value, that is, positions away from that data-related position by a distance L0. In other words, the surface of the sphere having the concerned data-related position as a center and a radius L0 constitutes the surface of the closed area which surrounds the data-related position. Also, for example, when two data-related positions are defined in the virtual space 10 apart from each other by a distance smaller than 2 LM, either one or two surfaces of a closed area/areas is/are defined in positions where the sum of the function values of the metaballs associated with the concerned data-related positions amount to a predetermined surface defining value. That is, when the surface of one closed area is defined, that closed area surrounds the two data-related positions. Meanwhile, when the surfaces of two closed areas are defined, the respective closed areas surround the two respective data-related positions. When the data-related position surrounded by one of the two closed areas approaches the data-related position surrounded by the other closed area, and the distance between the two data-related positions has become smaller than a distance 2 LM, portions of the closed areas, closest to the mutual other closed areas become swell. And if the data-related positions kept getting closer to each other, the closed areas are unified and the two data-related positions are surrounded by one closed area.

Figure 3:
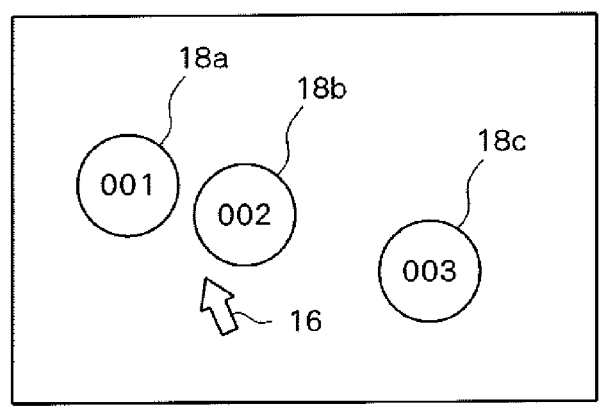
FIG. 3 is a diagram showing a space image shown on a display device.

FIG. 3 is a diagram showing one example of an image (a space image) of the virtual space 10 shown on the display device which constitutes the information processing device according to the embodiment. The shown space image is visualization of the virtual space 10 shown in FIG. 1, including an area image 18a corresponding to the data-related position 12a and the closed area 14a surrounding the data-related position 12a, an area image 18b corresponding to the data-related position 12b and the closed area 14b surrounding the data-related position 12b, and an area image 18c corresponding to the data-related position 12c and the closed area 14c surrounding the data-related position 12c. This space image is an image of a picture obtained by viewing the virtual space 10 from a viewpoint in a viewing direction, which are set in the virtual space 10. The area image 18 includes an image representative of the data associated with the corresponding data-related position 12. For example, either a thumbnail image representative of the data or the character string of the data name (a file name) may be shown in the area image 18.

The space image includes a cursor image 16, which moves in the space image according to an operation carried out to an input device, including a pointing device such as a mouse or the like and/or a coordinate input means such as a touch pad or the like, which constitute the information process device. By placing the cursor image 16 in any area image 18, using the input device, and moving the cursor image 16 so positioned while pressing a predetermined button of the input device (a so-called drag and drop operation), the area image 18 can be moved in the space image. Accordingly, the data-related position 12 corresponding to the area image 18 also moves in the virtual space 10. It should be noted that a camera (image capturing means) may be provided to the information processing device so that the area image 18 is moved in the space image according to the movement of the user of which image is captured by the camera.

Figure 4:
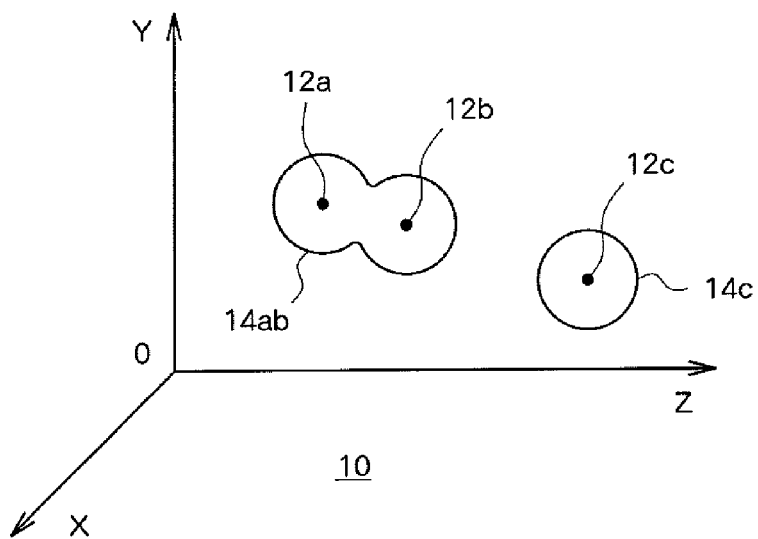
FIG. 4 is a diagram showing a virtual space (after movement of a closed area) to be managed in the information processing device according to an embodiment of the present invention.
Figure 5:
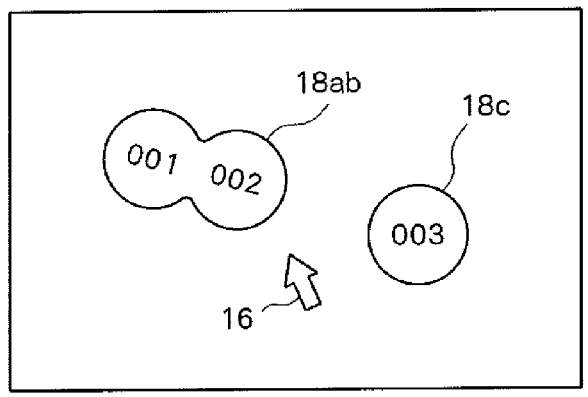
FIG. 5 is a diagram showing a space image shown on the display device.
Figure 6:
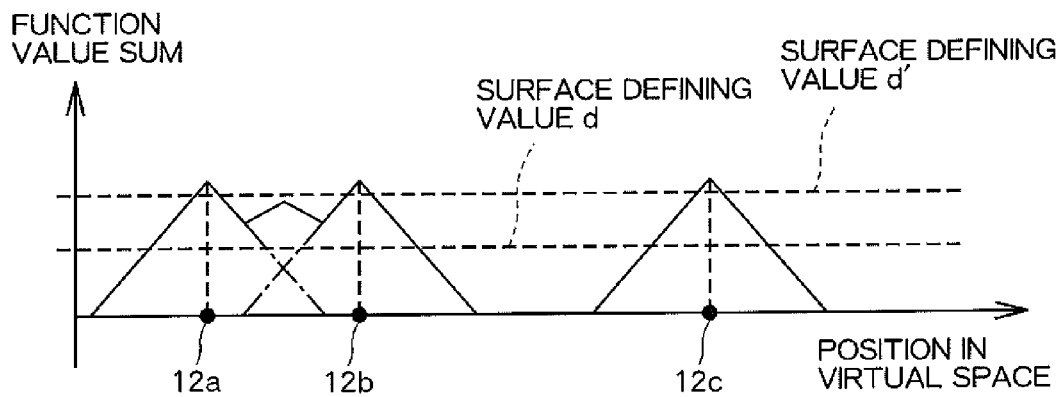
FIG. 6 is a diagram showing distribution of the sum of function values in the virtual space.

In response to the operation described above, the closed areas 14a to 14c in the virtual space 10 are deformed according to the movement of any data-related position, and apart or entirety thereof may be unified in some cases. FIG. 4 is a diagram showing the virtual space 10 after the data-related positions 12b is operated so as to approach the data-related position 12a. As shown, with the data-related position 12b approaching the data-related position 12a, the closed area 14b corresponding to the data-related position 12b is unified with the closed area 14a corresponding to the data-related position 12a and, consequently, a closed area 14ab, which surrounds the data-related positions 12a and 12b, appears in the virtual space 10. FIG. 5 shows the space image obtained by visualizing the virtual space 10 shown in FIG. 4. As shown, the space image contains the area image 18ab representative of the closed area 14ab, or unified closed areas 14a and 14b. The area image 18ab contains thumbnail images or the like representative of the respective data items associated with the data-related positions 12a and 12b surrounded by the closed area 14ab. FIG. 6 shows distribution of the sums of the function values on the line 15 passing through the data-related positions 12a to 12c, shown in FIG. 5. As shown, with the data-related positions 12a and 12b approaching each other, the sum of the function values corresponding to the data-related positions 12a, 12b exceeds a surface defining value d at a position between the data-related positions 12a and 12b, as a result of which a unified closed area 14ab is produced.

As described above, in the information processing device according to this embodiment, the cursor image 16 can be moved in the space image by using the input device so that a data-related position can be moved in the virtual space 10 according to the movement. With the data-related position of a certain data item approaching that of another data item, the closed areas surrounding the respective data-related positions are deformed to be unified. In the above, should the data items respectively associated with the plurality of data-related positions surrounded by the unified closed area be targets to be processed (a process target) using a program, these data items are grouped. Then, in the area image associated with the unified closed areas, a thumbnail image or the like representative of the process target data related to the data-related position surrounded by the closed area is contained. Once two or more closed areas 14 are thus unified, in thereafter moving some of the data-related positions surrounded by the unified closed area 14, the remaining data-related positions surrounded by that closed area 14 are also moved accordingly in the virtual space 10. As described above, according to this embodiment, by only moving a data-related position associated with any process target data to that associated with other process target data, these process target data items can be readily grouped. Moreover, as thumbnail images or the like representative of the respective process target data items are contained in the area image related to the grouped process target data items, the user can intuitively know the content of the grouped process target data.

Further, in this embodiment, when the data items respectively associated with the plurality of data-related positions surrounded by the unified closed area includes program data and program process target data thereof, the process target data is processed using the program. That is, in response to the user's operation to move the closed area associated with a program and that with the process target data to each other, the closed areas are deformed to be unified. By thus unifying the closed areas, it is possible to instruct processing of the process target data using the program. Once program processing of process target data begins, the interval between the data-related position associated with the program and that associated with the process target data is forcibly widened either immediately or after completion of the processing, whereby the unified closed areas are separated into the closed area associated with the program and that associated with the process target data. For forcible separation of the data-related positions, a picture showing the data-related positions being separated by a repulsion force inversely proportional to the distance between the data-related positions or the power value thereof may be reproduced by means of physical simulation.

In this embodiment, when at least one of the closed areas associated with the program and that associated with the process target data is moved so as to get closer to each other, as described above, the closed areas are deformed accordingly. This makes it possible for the user to realize in advance that the process target data is processed using the program in response to the user's operation.

Obviously, the unified closed areas may remain unified after completion of the program processing. In this case, a texture describing a program processing history may be mapped onto the unified closed area. A texture describing the processing history may include the image of liquid accumulated to an amount in accordance with the number of processed process target data items or an image obtained by combining thumbnail images of process target data in the closed area.

Figure 7:
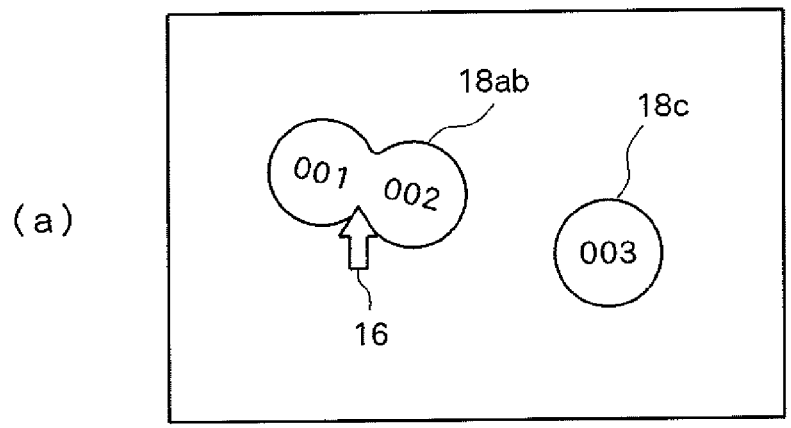
FIG. 7 is a diagram showing a space image when displaying the space enlarged.
Figure 7:
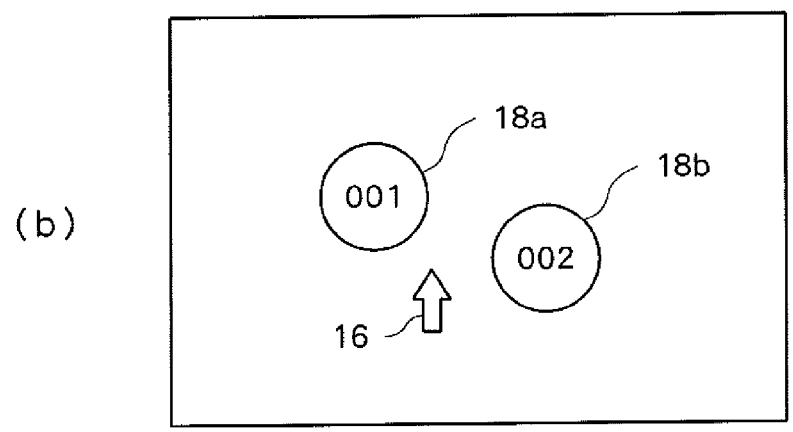

In this embodiment, the user can arbitrarily change the above-described surface defining value. The position of the surface of each closed area 14 is determined by the surface defining value, as described above. In this embodiment, the user can arbitrarily change the surface defining value, using the input device, so as to allow the user to change the position of the surface of each closed area 14. That is, as shown in FIG. 7 (a), with the area image 18ab representative of the closed area surrounding two data-related positions shown on the display device, for example, application of an operation to change the surface defining value to a larger value while designating the area image 18ab, using the cursor image 16 (double clicking the mouse, or the like) can change the surface defining value to a larger value. As a result, the area image 18ab is separated into two area images 18a and 18b, as shown in FIG. 7 (b). That is, as shown in FIG. 6, with the surface defining value d having been changed to a larger surface defining value d', an area with the sum of the function values in excess of the surface defining value d' is narrowed, and the area image 18ab is accordingly separated into the area images 18a and 18b. In the above, the space image is shown enlarged on the display device with the position indicated by the cursor image 16 in the virtual space 10 as a center. In separation of the area image 18ab into two area images 18a and 18b, grouping of the data item associated with the area image 18a and that associated with the area image 18b may be released. As described above, an arrangement which allows the user to change the surface defining value makes it possible for the user to immediately know with what number of data items the area image is associated. This improves the convenience. It should be noted that, in response to an operation to change the surface defining value to a small value (an operation to change the surface defining value d' to the surface defining value d, shown in FIG. 6, for example), the surface defining value is changed to a smaller value, upon which the area images 18a and 18b are accordingly unified again into the area image 18ab.

Also, in this embodiment, the degree of relevance between data items is calculated based on the data attribute (data type, for example), and the data-related positions of the data items are made approaching or separated with respect to each other in the virtual space 10 according to the degree of relevance. With the above, when the data-related positions for data having degree of relevance equal to or larger than a predetermined threshold are located with an interval smaller than a predetermined distance in the virtual space 10, the data-related positions can be moved so as to get closer to each other. Meanwhile, when the data-related positions for data having degree of relevance smaller than a predetermined threshold are located with an interval smaller than a predetermined distance in the virtual space 10, the data-related positions can be moved so as to get farther from each other. In this manner, grouping of associated data can be facilitated, and grouping of not-associated data can be made difficult, which improves the convenience.

Figure 8:
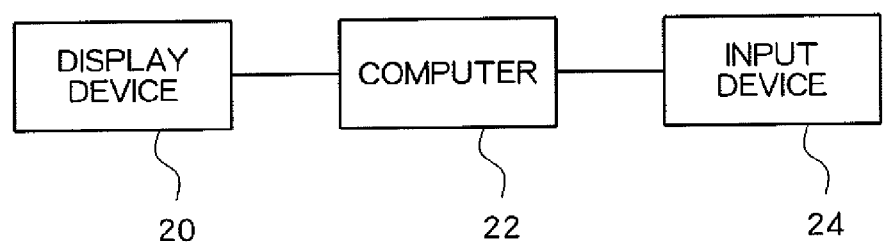
FIG. 8 is a diagram showing a hardware structure of the information processing device.

In the following, a structure of an information processing device according to this embodiment will be described. FIG. 8 is a diagram showing a hardware structure of the information processing device according to this embodiment. As shown, the information processing device comprises a display device 20, a computer 22, and an input device 24, with the display device 20 comprising a CRT, an LCD, or the like. The computer is formed using a processor and a memory as main components, including a personal computer, a consumer game machine, a home server, and so forth, for example. The input device 24 includes a pointing device such as a mouse or the like, a keyboard, a remote controller, and so forth.

Figure 9:
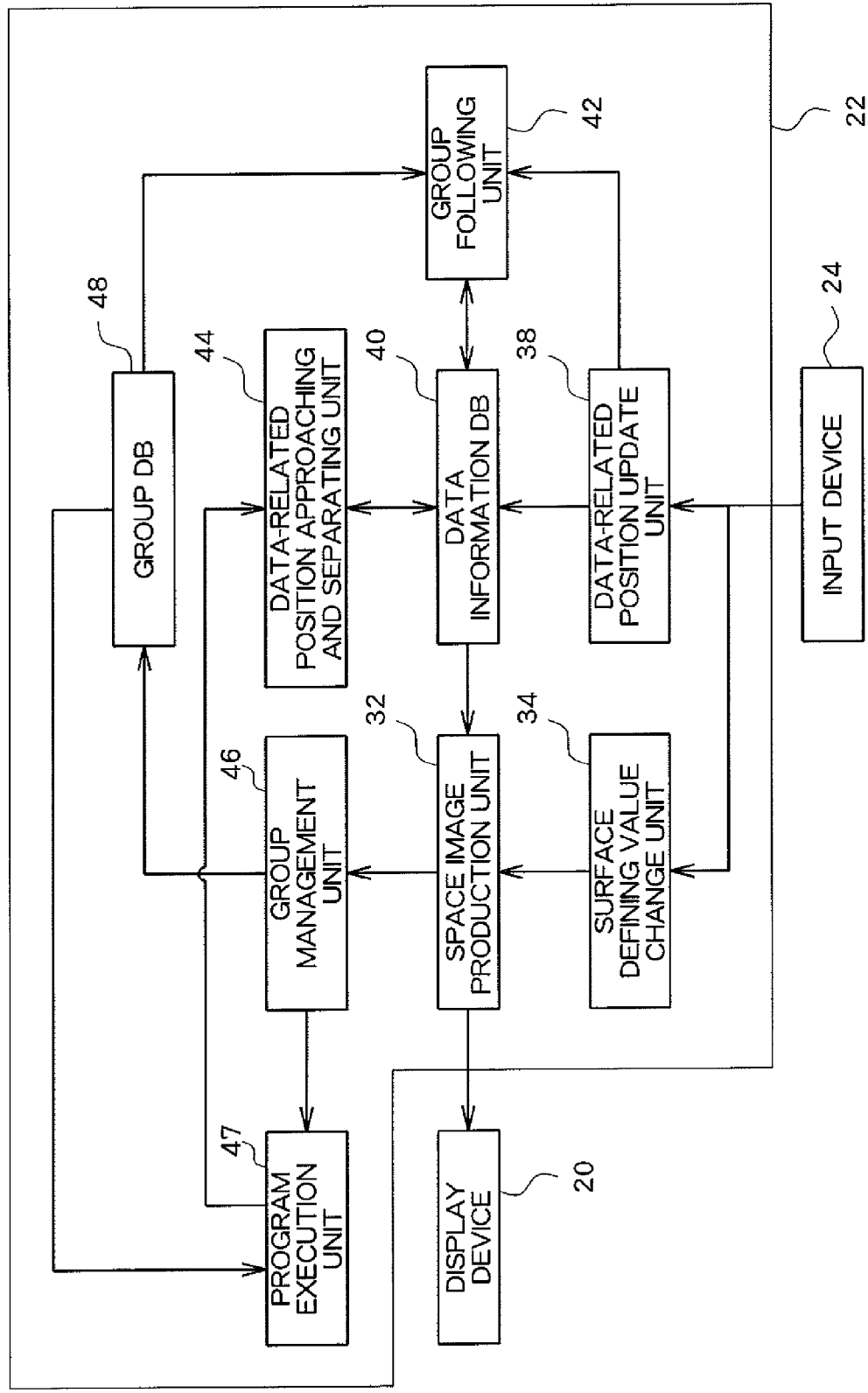
FIG. 9 is a functional block diagram of the information processing device.

FIG. 9 is a functional block diagram showing the information processing device according to this embodiment. As shown, the computer 22 of this information processing device comprises, in terms of functions, a space image production unit 32, a surface defining value change unit 34, a data-related position update unit 38, a data information database 40, a group following unit 42, a data-related position approaching and separating unit 44, a group management unit 46, a program execution unit 47, and a group database 48. These functions are realized by executing a program according to this embodiment in the computer 22.

Initially, the data information database 40 is provided in a strange device such as a hard disk or the like provided in the computer 22, and stores a data ID, a pass, a data-related position, thumbnail data, attribute 1 and attribute 2 in association with one another, as shown in FIG. 10. The data ID is identification information of data stored in the computer 22 or another computer (not shown) connected for communication with the computer 22. The pass is data specifying the location of the data identified by the data ID. The data-related position is position coordinates in the virtual space 10, which are made associated with the data identified by the data ID. The thumbnail data is data specifying the location of a thumbnail image representative of the data identified by the data ID. The attribute 1 is data describing the attribute of data identified by the data ID, specifically, being one or more key word/words relating to the data here. The attribute 2 is data, in the case of data identified by the data ID being process target data, which specifies a program for processing the process target data, and in the case of data identified by the data ID being a program, data (a data file extension, for example) which specifies the kind of data to be processed by the program.

The group database 48 is also provided in the memory device of the computer 22, in which a group ID and a data ID are stored in association with each other, as shown in FIG. 11. As described above, in the information processing device according to this embodiment, a plurality of data items constitute a group, which is identified by a group ID. The data ID identifies the data belonging to a group identified by the group ID.

The data-related position update unit 38 selects a data-related position to be operated, according to the position of the cursor image 16 operated by the input device 24, and moves the data-related position in the virtual space 10 according to the movement of the cursor image 16. For example, with the cursor image 16 having the tip end thereof located in any area image 18, one of the positions in the space image 10, corresponding to the data-related positions in the area image 18, which is located closest to the tip end of the cursor image 17 is selected as a moving target. Then, the movement direction and distance of the cursor image 16 being moved through a drag and drop operation is obtained, and the data-related position selected as a moving target is moved accordingly. Then, the data-related position update unit 38 updates the data-related position selected as a moving target and stored in the data information database 40 to that after the movement. In moving any data-related position, the data-related position update unit 38 notifies the group following unit 42 of the data ID and movement direction and distance of the data associated with that data-related position. It should be noted that, when the cursor image 16 to be operated by the input device 24 is located in any area image 18, all of the positions in the space image, corresponding to the data-related positions in that area image 18 may be selected as moving targets. In this case, the movement direction and distance of the cursor image 16 being moved through a drag and drop operation may be obtained, and the data-related positions selected as moving targets may be moved according to the obtained movement direction and distance, together with the area image 18 itself.

In moving the data-related position of data belonging to any group, the group following unit 42 additionally moves the data-related positions of other data items belonging to the same group, while referring to the group database 48. That is, in updating any data-related position, the data ID and the movement direction and distance notified by the data-related position update unit 38 are obtained, and whether or not the obtained data ID is already stored in the group database 48 is determined. Then, when it is determined that the data ID is already stored in the group database 48, other data ID stored in association with the same group ID is read. Then, the data-related position associated with the read data ID is read from the data information database 40, and update the value thereof according to the movement direction and distance notified by the data-related position update unit 38.

The data-related position approaching and separating unit 44 reads the data on the attribute 1 stored in the data information database 40, then calculates the degree of relevance between the data items, and updates the data on the data-related position stored in the data information database 40 according to the degree of relevance. For example, in calculation of the degree of relevance between two data items, data on the attribute 1 of the data items is read from the data information database 40, and the degree of relevance between the data items may be calculated based on the number of common keywords contained in the data items. Further, the data-related positions of the data items are read from the data information database 40, and then made getting closer or farther with respect to each other according to the degree of relevance.

For example, suppose that the distance between the data-related position $P_i$ and the data-related position $P_j$ is defined as a distance $d_{ij}$ and the degree of relevance calculated based on the data attribute associated with these data-related positions is defined as degree of relevance $s_{ij}$. In the above, in the case where the distance $d_{ij}$ becomes equal to or smaller than a constraint distance lc, which is determined based on an increasing function of the degree of relevance $s_{ij}$ such as k1×$s_{ij}$, both of the data-related positions $P_i$, $P_j$ are constrained by a virtual spring. That is, it is preferable that the natural length of the virtual spring is defined as a decreasing function of the degree of relevance $s_{ij}$ such as kl×(1/$s_{ij}$), and the spring constant k is defined as an increasing function of the degree of relevance $s_{ij}$ such as kd×$s_{ij}$ (kl, kd being constants). With the above, the higher a degree of relevance $s_{ij}$ is, from the closer reference positions the data-related positions $P_i$ and $P_j$ get closer or farther with respect to each other. Also, the higher a degree of relevance $s_{ij}$ is, the more strongly (faster) the data-related positions $P_i$ and $P_j$ get closer or farther with respect to each other. Further, the higher the degree of relevance $s_{ij}$ is, the larger constraint distance lc becomes, as a result of which data-related positions $P_i$, $P_j$ located farther from each other are subjected to spring constraint.

As to be described later, after program processing of a process target data, the data-related position associated with the program and that associated with the process target data are forcibly moved apart from each other to thereby release the unification of the closed areas.

The space image production unit 32 produces an image showing the virtual space 10, or a space image, based on the information stored in the data information database 40, which is then displayed by the display device 20. Specifically, some or all of the data-related positions are read from the data information database 40 according to the viewpoint position and viewing direction set in the virtual space 10, and the position of the surface of the closed area 14 in the virtual space 10 is determined according to the data-related positions and metaball functions. That is, a position where the sum of the function values of the metaballs associated with the respective data-related positions amounts to a predetermined surface defining value is determined as the position of the surface of a closed area which surrounds one or more of the data-related positions. Then, thumbnail data associated with the data-related position surrounded by the closed area 14 of which surface position is determined as described above is read from the data information database 40, and a thumbnail image specified by the thumbnail data is placed on the surface of the concerned closed area 14. The image of the virtual space 10 where the thumbnail image is placed on the surface of the closed area 14 as described above is produced according to the viewpoint position and viewing direction, and then displayed by the display device 20.

In determination of the position of the surface of a closed area as described above, the group management unit 46 determines whether or not the surface of any closed area is newly unified with other closed area or whether or not any unification is released.

For example, the sum of the function values of all metaballs associated with data-related positions in the virtual space 10, at respective positions on lines connecting the respective data-related positions surrounded by a certain closed area and those surrounded by another closed area are calculated. When there is no position on any line, where the value of the sum is smaller than a surface defining value, it is determined that the closed areas are newly unified. Meanwhile, when there is at least one position on any lines, where the value of the sum of the function values of the metaballs is smaller than the surface defining value, it is determined that two closed areas associated with the two respective data-related positions selected are yet to be unified. Also, the group management unit 46 calculates the sum of the function values of all metaballs associated with the respective data-related positions in the virtual space 10 on the respective lines connecting one of the data-related positions surrounded by a certain closed area and the respective other data-related positions. When there is no position on any lines, where the value of the sum is smaller than a surface defining value, it is determined that these data-related positions remain still surrounded by a common closed area (the unification is maintained). Meanwhile, when there is at least one position where the sum of the function values of the metaballs is smaller than the surface defining value, it is determined that the unification is released, and that the one data-related position is surrounded by another closed area.

According to another aspect, a bounding box (formed using a polygon) having a fixed size may be placed for every data-related position so as to surround that data-related position, and whether or not the bounding boxes interfere with each other is determined to make detailed determination on unification as explained only for the bounding boxes interfere with each other. Alternatively, more simply, whether or not the bounding boxes interfere with each other may be determined to determine whether or not the closed areas are unified or any unification is released.

According to still another aspect, whether or not the distance between data-related positions is smaller than a predetermined distance may be determined to make detailed determination on unification only when the distance is smaller than the predetermined distance. Alternatively, more simply, whether or not the distance between the data-related positions is smaller than a predetermined distance may be determined to determine whether or not the closed areas are unified or unification is released.

When it is determined that the closed areas are unified, the group management unit 46 stores the data IDs of data associated with the data-related positions surrounded by the unified closed area in association with a common group ID in the group database 48. In this manner, when the closed areas are unified, data is grouped accordingly. Also, when unification is released, the data IDs of the data items associated with the respective data-related positions surrounded by the respective separated closed areas are stored in the group database 48 in association with respective different group IDs. When one or each of the two separated closed areas surrounds only one data-related position, the data ID of the data associated with that data-related position is deleted from the group database 48.

Also, when a closed area surrounding a data-related position associated with program data is newly unified with a closed area surrounding a data-related position associated with process target data for the program, one or all of the process target data items associated with the data-related positions surrounded by the latter closed area is/are processed using the program associated with the data-related position surrounded by the former closed area. That is, whether or not the data-related position associated with the program and that associated with the process target data are surrounded by a common closed area is determined while referring to the column of the attribute 2 in the data information database 40, and when they are, the program is started with designation of the process target data as an argument thereof. In this case, the number of data-related position associated with the process target data surrounded by the unified closed area is determined with reference to the group database 48, and, when the number is one, the process data is immediately processed using the program. Meanwhile, when the number is two or more, a menu screen image is shown so that the user can designate one or all of the data-related positions before processing the designated data-related position/positions. Alternatively, all or some of the data-related positions selected in advance according to a predetermined criterion may be sequentially processed.

After processing the process target data using the program, the program execution unit 47 instructs the data-related position approaching and separating unit 44 so as to put apart the data-related position associated with the program and that associated with the process target data.

The surface defining value change unit 34 changes the above-described surface defining value in response to an operation carried out to the input device 24. With the above, the size of the closed area 12 is changed.

According to the above described information processing device, by moving the data-related position 12 in the virtual space 10, using the input device 24 such as a mouse or the like, a plurality of data items can be readily grouped. This can remarkably enhance the convenience.

It should be noted that the above-described information processing device is adapted to various modifications, including one, for example, in which the space image includes other image. For example, the space image may include a viewer image 17 so that, when the area image 18 is moved to the position of the viewer image 17 by means of a drag and drop operation, an image associated with the area image appears to be shown inside the viewer image 17. For example, when the area image 18ab associated with two data items is moved to the position of the viewer image 17 by means of a drag and drop operation using the cursor image 16, as shown in FIG. 12 (a), the thumbnail images representative of the two respective data items associated with the area image 18ab may be shown apart from each other in the viewer image 17, as shown in FIG. 12 (b). With the above, information about the data associated with the area image 18 can be made output through an intuitive operation.

Although it is described in the above that, when a closed area associated with a program is unified with that associated with one or more process target data, some or all of the process target data is promptly begun being processed using a program, the processing may be begun in response to an explicit user instruction. In this case, data ID identifying the program and that identifying the process target data, respectively associated with data-related positions surrounded by the unified closed area are once registered in the group database 48, and the process target data may be processed using the program, similar to the above, in response to a process execution instruction which is made later while designating the unified closed area, or a group.

The invention claimed is:

1. An information processing device, comprising:
displaying unit for displaying an image of a space in which a plurality of data-related positions are located, each data-related position being associated with one or more of a plurality of data items, and each data-related position being surrounded solely or together with one or more other data-related positions by a respective closed area, such that each closed area is a separate area that adheres to a respective metaball function, where the metaball function defines metaball values as a function of distances from the data-related position or positions within a given closed area;
operation unit for allowing a user to operate so as to arbitrarily move one or more of the data-related positions in the space;
closed area update unit for updating each closed area in the space according to movement of the data-related position or positions in the space, where such updating is accomplished by: (i) computing respective sums of the metaball values established by the respective metaball functions of each data-related position and by respective distances from each data-related position; and (ii) defining a respective surface of each closed area by comparing the respective sums to a predetermined threshold; and
grouping unit for grouping, when a plurality of data-related positions are surrounded by a common closed area, the data items associated with the plurality of data-related positions.

2. The information processing device according to claim 1, wherein the grouping unit causes the data-related positions surrounded by the common closed area to move following each other in the space, according to an operation carried out by the operation unit.

3. The information processing device according to claim 1, wherein the closed area update sets an area as the closed area in the space, the area being a set of positions where the sum of metaball values is equal to or larger than the predetermined threshold.

4. The information processing device according to claim 3, further comprising threshold changing unit for changing the predetermined threshold.

5. The information processing device according to claim 1, further comprising data-related position approaching and separating unit for calculating a degree of relevance between data items based on attribute information on the respective data items, and causing the data-related positions associated with the data items to approach or separate with respect to each other in the space.

6. The information processing device according to claim 1, wherein the operation unit enables the user to arbitrarily move the closed area distinctively displayed by the image, and for moving, when moving the closed area, one or more data-related positions surrounded by the closed area.

7. A user interface method, comprising:
displaying an image of a space in which a plurality of data-related positions are located, each data-related position being associated with one or more of a plurality of data items, and each data-related position being surrounded solely or together with one or more other data-related positions by a respective closed area, such that each closed area is a separate area that adheres to a respective metaball function, where the metaball function defines metaball values as a function of distances from the data-related position or positions within a given closed area;
receiving an operation by a user to arbitrarily move one or more of the data-related positions in the space;
updating each closed area in the space according to movement of the data-related position or positions in the space, where such updating is accomplished by; (i) computing respective sums of the metaball values established by the respective metaball functions of each data-related position and by respective distances from each data-related position; and (ii) defining a respective surface of each closed area by comparing the respective sums to a predetermined threshold; and grouping, when a plurality of data-related positions are surrounded by a common closed area, the data items associated with the plurality of data-related positions.

8. A non-transient, computer readable information storage medium storing a program for causing a computer to execute the steps of:

displaying an image of a space in which a plurality of data-related positions are located, each data-related position being associated with one or more of a plurality of data items, and each data-related position being surrounded solely or together with one or more other data-related positions by a respective closed area, such that each closed area is a separate area that adheres to a respective metaball function, where the metaball function defines metaball values as a function of distances from the data-related position or positions within a given closed area;

allowing a user to operate so as to arbitrarily move one or more of the data-related positions in the space;

updating each closed area in the space according to movement of the data-related position or positions in the space, where such updating is accomplished by; (i) computing respective sums of the metaball values established by the respective metaball functions of each data-related position and by respective distances from each data-related position; and (ii) defining a respective surface of each closed area by comparing the respective sums to a predetermined threshold; and grouping, when a plurality of data-related positions are surrounded by a common closed area, the data items associated with the plurality of data-related positions.

9. The information processing device according to claim 1, wherein the closed area update unit operates to unify at least two closed areas into a common closed area surrounding two or more data-related positions when the sum of the metaball values, established by the respective metaball functions of such least two closed areas, is equal to or larger than the predetermined threshold.

10. The information processing device according to claim 9, further comprising threshold changing unit for changing the predetermined threshold.

* * * * *